US010326587B2

United States Patent
Ghosh et al.

(10) Patent No.: US 10,326,587 B2
(45) Date of Patent: Jun. 18, 2019

(54) ULTRA-LIGHTWEIGHT CRYPTOGRAPHY ACCELERATOR SYSTEM

(71) Applicant: Intel Corporation, Santa Clara, CA (US)

(72) Inventors: Santosh Ghosh, Hillsboro, OR (US); Li Zhao, Beaverton, OR (US); Rafael Misoczki, Hillsboro, OR (US); Manoj R Sastry, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 204 days.

(21) Appl. No.: 15/392,252

(22) Filed: Dec. 28, 2016

(65) Prior Publication Data

US 2018/0183573 A1  Jun. 28, 2018

(51) Int. Cl.
 *H04L 9/06* (2006.01)
 *H04L 9/32* (2006.01)
 *G06F 13/28* (2006.01)
 *G06F 21/72* (2013.01)
 *G06F 1/3296* (2019.01)

(52) U.S. Cl.
 CPC .......... *H04L 9/0618* (2013.01); *G06F 1/3296* (2013.01); *G06F 13/28* (2013.01); *G06F 21/72* (2013.01); *H04L 9/0643* (2013.01); *H04L 9/3242* (2013.01); *Y02D 10/14* (2018.01)

(58) Field of Classification Search
 CPC ... H04L 9/0618; H04L 9/0643; H04L 9/3242; G06F 1/3296; G06F 13/28; G06F 21/72
 See application file for complete search history.

(56) References Cited

U.S. PATENT DOCUMENTS

| 9,531,689 | B1* | 12/2016 | Romero-Mariona ........................ H04L 63/0471 |
| 2008/0304659 | A1* | 12/2008 | Ozturk .................. H04L 9/0631 380/44 |
| 2009/0060197 | A1* | 3/2009 | Taylor ................... H04L 9/0618 380/277 |
| 2015/0235053 | A1* | 8/2015 | Lee ......................... G06F 21/72 713/193 |
| 2016/0359636 | A1* | 12/2016 | Kreft ....................... G06F 21/71 |
| 2017/0126399 | A1* | 5/2017 | Sorimachi ............. H04L 9/0625 |
| 2018/0233069 | A1* | 8/2018 | Fiske ....................... G09C 1/00 |

* cited by examiner

*Primary Examiner* — Techane Gergiso
(74) *Attorney, Agent, or Firm* — Schwegman Lundberg & Woessner, P.A.

(57) ABSTRACT

A cryptography accelerator system includes a direct memory access (DMA) controller circuit to read and write data directly to and from memory circuits and an on-the-fly hashing circuit to hash data read from a first memory circuit on-the-fly before writing the read data to a second memory circuit. The hashing circuit performs at least one of integrity protection and firmware/software (FW/SW) verification of the data prior to writing the data to the second memory circuit. The on-the-fly hashing circuit includes a bit repositioning circuit to designate an order of bits of a binary word in a register from a most significant bit (MSB) to a least significant bit (LSB) for performing computations without rotating bits in the register, and an on-the-fly round constant generator circuit to generate a round constant from a counter.

23 Claims, 6 Drawing Sheets

ULTRA-LIGHTWEIGHT CRYPTOGRAPHY ACCELERATOR SYSTEM

TECHNICAL FIELD

Embodiments described herein generally relate to cryptographic hardware, and in particular, to an ultra-lightweight cryptography accelerator system.

BACKGROUND

Internet-connected sensor devices (often referred to as Internet-of-Things or IoT sensor devices) are increasingly being deployed in various applications, such as in monitoring agricultural crops, collecting environmental data, etc., and transmitting this data over an Internet connection. Such devices are typically expected to be low-cost devices that use little power. Often, such devices harvest energy from the environment, for example, the sun, and may therefore be solar powered.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings, in which.

DETAILED DESCRIPTION

Figure 1:
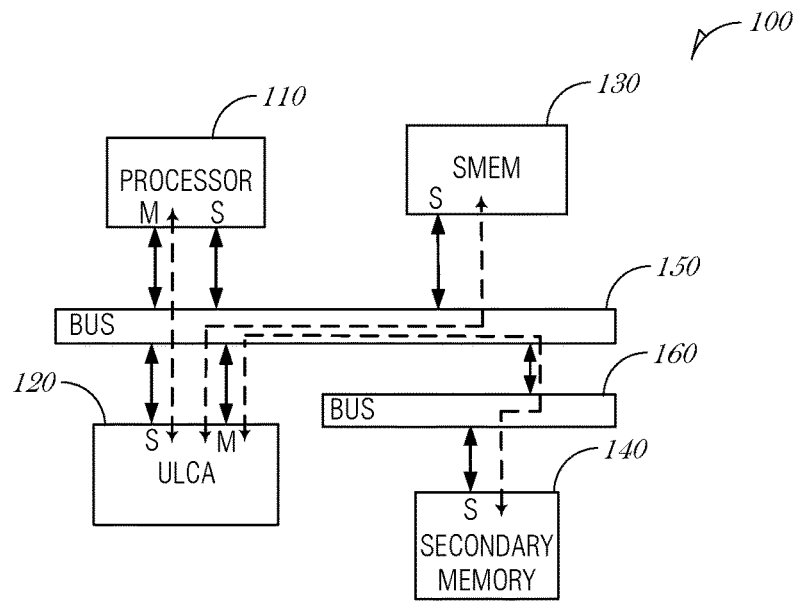
FIG. 1 is a block diagram illustrating a system that includes an ultra-lightweight cryptography accelerator (ULCA), according to an embodiment.

In the following description, for purposes of explanation, numerous specific details are set forth in order to provide a thorough understanding of some example embodiments. It will be evident, however, to one skilled in the art, that the present disclosure may be practiced without these specific details.

Because IoT sensor devices are connected to the Internet, there is a desire for them to be secure, for example, by supporting data integrity and confidentiality as well as being able to verify authenticity of firmware and software before execution. Because of cost and power limitations, typical cryptography algorithms (e.g., Advanced Encryption Standard (AES) and Secure Hash Algorithm (SHA)-256) may not be suitable to provide security for IoT sensor devices' due to being designed for larger semiconductor surface area devices having larger power budgets. For example, a current small footprint cryptography accelerator using AES and SHA-256 for IoT devices may have a footprint of 60,000 gates and require 1.2 mW of power. This may not be suitable for current IoT sensor devices because this may occupy 10% or more of the semiconductor surface area of the device, and exceeds a typical device power budget on the order of microWatts. The present inventors have recognized that there is a need for an improved cryptography accelerator having less computational complexity to use fewer gates and less power than typical current cryptography accelerators.

In various embodiments, an ultra-lightweight cryptography accelerator (ULCA) includes a built-in direct memory access (DMA) controller circuit to transfer instructions and/or data directly from one memory circuit to another memory circuit while performing on-the-fly hashing, which may facilitate software and firmware verification. By doing so, latency and power requirements may be reduced compared to typical DMA solutions that transfer the instructions and/or data from one memory circuit to another memory circuit and then perform hashing on the instructions and/or data after the transfer is complete. In the embodiments, only a single pair of memory read and writes are performed while performing the combined operations of the DMA transfer and the hashing, whereas in the typical cryptography accelerator solutions, there is a pair of memory read and writes for the transfer by a typical DMA circuit, plus a pair of memory read and writes for the hashing by the typical cryptography accelerator. In an embodiment, on-the-fly hashing may save 46,000 clock cycles compared to the typical cryptography accelerator solutions, and may therefore use about thirty times less energy than the typical cryptography accelerator solutions. In addition, embodiments may include an optimized DMA logic that results in occupying significantly smaller chip area than traditional DMA circuits, for example, about 10 to 15 times smaller.

In various embodiments, the hashing may be performed using hardware circuits rather than software performed by a microcontroller in order to reduce latency and power requirements. The hashing may be performed by a Keccak hash compression circuit using a bit repositioning circuit rather than performing bit rotation as in typical implementations of the Keccak hash compression function. Whereas bit rotation typically takes one clock cycle per bit position moved in a typical Keccak hash compression circuit, there may be no clock cycle latency for repositioning the bits within a register as in the embodiments discussed herein. For example, in an 8 bit register, the left-most bit may be initially designated as the most significant bit (MSB) and the right-most bit may be designated as the least significant bit (LSB). The bit repositioning circuit may be controlled to designate a different pair of the 8 bits as the MSB and LSB. For example, the fourth bit from the left in the register may be re-designated as the MSB, the third bit from the left may be re-designated as the LSB, and the bit repositioning circuit may include data paths and switches to cause all read and write accesses to the register to communicate with other circuits accessing the register according to the repositioned bits with no additional clock latency. This may save three clock cycles compared to performing bit-rotations on the same register. This may also save on-chip circuit area by requiring fewer gates and bit storage locations compared to typical Keccak hash compression circuits that include bit-rotation circuitry. For example, in an embodiment, 225 bit-storage locations and 1,200 gates, as well as 15 clock cycles latency, may be saved compared to typical Keccak hash compression circuits.

In various embodiments, an on-the-fly round constant (RC) generator circuit may generate RC's on-the-fly from a round number (e.g., a counter value) as opposed to typical Keccak compression circuits that store twenty sixteen-bit RC's to use during execution of an ι sub-function, thereby reducing semiconductor die surface area. For example, embodiments may save 1,600 gates compared to typical Keccak compression circuits. In an embodiment, an optimized combinational block to generate the RC's on-the-fly may only require 69 gates.

In various embodiments, a cryptography algorithm may be performed by a hardware circuit rather than by software running on a microcontroller in order to reduce latency and power requirements. A PRINCE block cipher may include an optimized mechanism for a substitution-box (S-box) followed by diffusion operations that replaces a traditional look-up table and matrix multiplication with Boolean logic, yielding semiconductor die area reductions of 250% (2.5×) and 3,100% (31×), respectively.

In various embodiments, one or more sub-circuits of the ULCA may include a wake-on-demand circuit to facilitate the one or more sub-circuits being in a sleep or nonoperational state except when being utilized, thereby reducing power dissipation and saving energy. These sub-circuits may include a DMA controller circuit, a hashing circuit, a block cipher circuit, and a random number generator (RNG) circuit.

Overall, an embodiment of the ULCA described herein may have a 3× die area efficiency and a 4× energy efficiency compared to a typical cryptography accelerator for IoT applications. Chip area and latency optimizations of embodiments of the ULCA described herein may be facilitated by redefining sequences for computing internal sub-functions of hashing and block cipher operations, for example, Keccak hashing sub-functions ρ, π, and ι, and PRINCE block cipher S-box and diffusion operations.

FIG. 1 is a block diagram illustrating a system 100 that includes an ULCA 120, according to an embodiment. The system 100 may be implemented as part of a system on chip (SoC) subsystem. The system 100 may be included in an energy harvesting IoT sensor platform.

The system 100 includes a processor 110 that includes a master port M and a slave port S. The ULCA 120 includes a master port M and a slave port S. The processor 110 may configure the ULCA 120 by communicating through the processor 110's master port M with the ULCA 120's slave port S. Communications between the processor 110 and the ULCA 120 may be via a bus 150. Embodiments of the bus 150 may include an ARM® Advanced Microcontroller Bus Architecture (AMBA®) Advanced High-Performance Bus (AHB).

The ULCA 120 may include a DMA circuit to read and write data to and from a computer system memory SMEM 130 by communicating through the ULCA 120's master port M and the SMEM 130's slave port S via the bus 150. The SMEM 130 may include a static random access memory (SRAM) circuit or a dynamic random access memory (DRAM) circuit. The DMA circuit may also read and write data to and from a secondary memory, for example, a nonvolatile memory or Serial Peripheral Interface Bus (SPI) flash memory, by communicating through the ULCA 120's master port M and a secondary memory 140's slave port S via both the bus 150 and a bus 160. Embodiments of the secondary memory 140 may include a nonvolatile memory or a SPI-flash memory. Embodiments of the bus 160 may include an AMBA Advanced Peripheral Bus (APB). While the embodiment of FIG. 1 illustrates specific bus standards and specific memory circuit types, these should not be construed as limiting, as in various embodiments, different memory circuit types may be used in place of the SMEM 130 and secondary memory 140, and different bus standards may be used in place of the bus 150 and the bus 160.

The ULCA 120 may provide security, for example, 128-bit security, for the system 100. The following are security properties that may be provided by the ULCA 120:

Confidentiality via a block cipher encoding circuit. For example, the block cipher circuit may implement a lightweight block-cipher, e.g., SIMON, SPECK, or PRINCE. In an embodiment, the block cipher encoding circuit may implement a PRINCE block cipher having a 64-bit input/output block and a 128-bit key.

Authenticity via the block cipher circuit in combination with a cipher block chaining (CBC)—message authentication code (MAC). An embodiment of a CBC-MAC may include a 64-bit counter with CBC-MAC (CCM) based PRINCE block cipher to achieve authenticated encryption.

Integrity via a hashing circuit. For example, the hashing circuit may perform hashing of data using a Keccak, S-Quark, BLAKE, or other hashing algorithm suitable for low power devices with small circuit footprints. In an embodiment, to provide 128-bit secure integrity protection, the ULCA 120 may include a Keccak-400 hashing circuit that is flexible to execute both traditional hash and keyed hash (e.g., hash-based message authentication code or HMAC) operations supporting various key sizes, e.g., 64-bit, 128-bit, and 256-bit keys.

Firmware (FW)/software (SW) verification via the hashing circuit. In an embodiment, the Keccak-400 hashing circuit implements a hash-based-signature scheme that may be used for FW/SW verification.

The ULCA 120 may perform on-the-fly hashing in conjunction with the DMA circuit transferring data from the secondary memory 140 to the SMEM 130. This approach provides lower latency for FW verification compared with traditional DMA approaches. Traditionally, a DMA engine would load a FW-image from a secondary memory to SRAM, then a crypto engine would separately perform hashing of the transferred data in the SRAM. The traditional approach would include two memory reads: a first memory read from the secondary memory and a second memory read from the SRAM. Because the ULCA 120 includes both a DMA circuit and a hashing circuit, the operations of the DMA circuit and the hashing circuit may be utilized together to perform on-the-fly hashing while the memory is transferred from the secondary memory 140 to the SMEM 130, which only involves one memory read. In addition, the ULCA 120 may avoid a setup time for the DMA of traditional solutions. In an embodiment, or a 32 KB firmware image transferred from secondary memory 140 to SMEM 130, the ULCA 120 may save 46,000 clock cycles compared to the traditional approach, and may therefore be more energy efficient.

The ULCA 120 may also provide power management of one or more internal circuits by facilitating the circuits to sleep and not consume energy when not being utilized, and then to wake on-demand and operate normally when being utilized. The power management may be fine-grained, with each of a plurality of circuits of the ULCA 120 configured to sleep and not consume energy when not being utilized, and then to wake on-demand and operate normally when being utilized. For example, during an initial system boot, the hashing circuit may be active while the block cipher circuit remains in sleep mode. Likewise, during data encryption, the hashing circuit may remain in sleep mode while the block cipher circuit is active.

Figure 2:
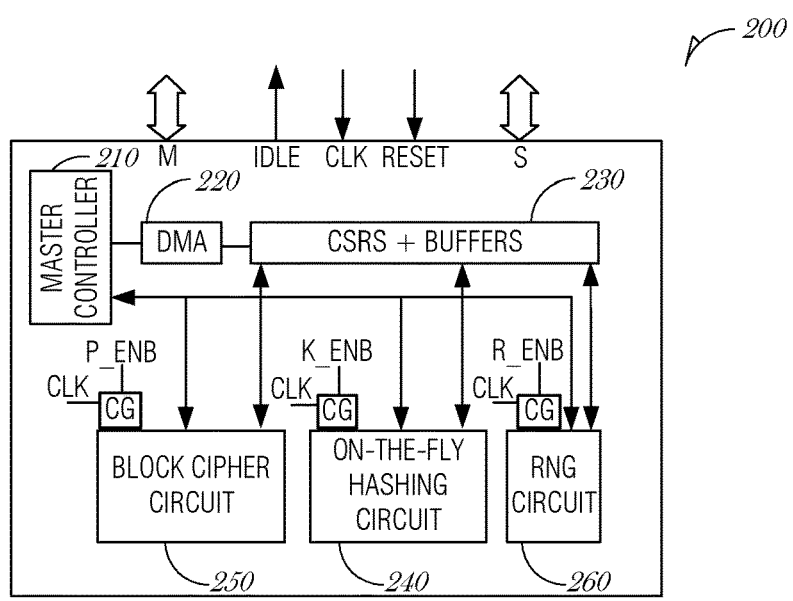
FIG. 2 is a block diagram illustrating an ULCA, according to an embodiment.

FIG. 2 is a block diagram illustrating an ULCA 200, according to an embodiment. The ULCA 200 may be an embodiment of the ULCA 120. The ULCA 120 includes a master controller 210 that controls the various units of the ULCA 120, including a DMA circuit 210, a block cipher circuit 250, an on-the-fly hashing circuit 240, and a random number generator (RNG) circuit 260. The DMA circuit 210 is coupled with control status registers (CSRS) and buffers 220 to read and write commands, statuses, and data. The DMA circuit 210 may also be coupled with the ULCA 200's master port M for communications with memory circuits over a data bus. The CSRS and buffers 220 may be memory mapped, and may be configured by a processor, e.g., the processor 110. The CSRS and buffers 220 may be coupled with the ULCA 200's master port M and slave port S. The CSRS and buffers 220 may include an interrupt mask, a command, a key, a source address, an initialization vector (IV) for the block cipher circuit 250, a destination address, or other data used for performing DMA operations, hashing, encryption, or other capabilities of the ULCA 200. The block cipher circuit 250 may include a PRINCE block cipher circuit with CCM mode logic. The on-the-fly hashing circuit 240 may implement Keccak-400 hashing. The RNG circuit 260 may be an embodiment of an INTEL® random number generator. Each of the block cipher circuit 250, on-the-fly hashing circuit 240, and RNG circuit 260 may be clock-gated by a clock gating circuit CG and enabled on-demand to provide fine-grained power management. The block cipher circuit 250 may be enabled on-demand by an enable signal P_ENB, the on-the-fly hashing circuit 240 may be enabled on-demand by an enable signal K_ENB, and the RNG circuit 260 may be enabled on-demand by an enable signal R_ENB. In an embodiment, the master controller 210 may generate the enable signals P_ENB, K_ENB, and R_ENB. The clock signal CLK may be received by the ULCA 200 from an external clock source and distributed to clock gating circuit CG of each of the block cipher circuit 250, on-the-fly hashing circuit 240, and RNG circuit 260. The ULCA 200 may indicate when it is idle by an IDLE output signal, and be reset when receiving an input RESET signal.

The block cipher circuit 250 may include an S-box component to obscure a relationship between a key and encrypted output of the block cipher circuit 250, a diffusion layer to dissipate redundancies while encrypting data, and a key-RC mixing component. The S-box component, diffusion layer, and key-RC mixing component may be implemented using an optimized gate-level design that results in the PRINCE block cipher circuit with CCM mode logic having about 12,000 gates with 12 clocks/block encryption/decryption latency.

The on-the-fly hashing circuit 240 may include a combined gate-level datapath for $\theta$, $\rho$, $\pi$, $\chi$, and $\iota$ steps of a Keccak-400 hashing method. In an embodiment, the combined gate-level datapath may have 3,423 gates with 20 clocks/block latency.

In an embodiment, the ULCA 200 may be developed using Verilog® register transfer logic (RTL). In an embodiment in which the ULCA 200 is implemented in silicon using INTEL 14 nm, 0.75 V, 70° C., 100 MHz process technology, a semiconductor surface area of the ULCA 200 may be about 2734 $\mu m^2$ or 12,000 gates, an encoding/decoding latency may be about 12 cycles/64-bit block, and a hash operation may be about 20 cycles/128-bit block.

Figure 3:
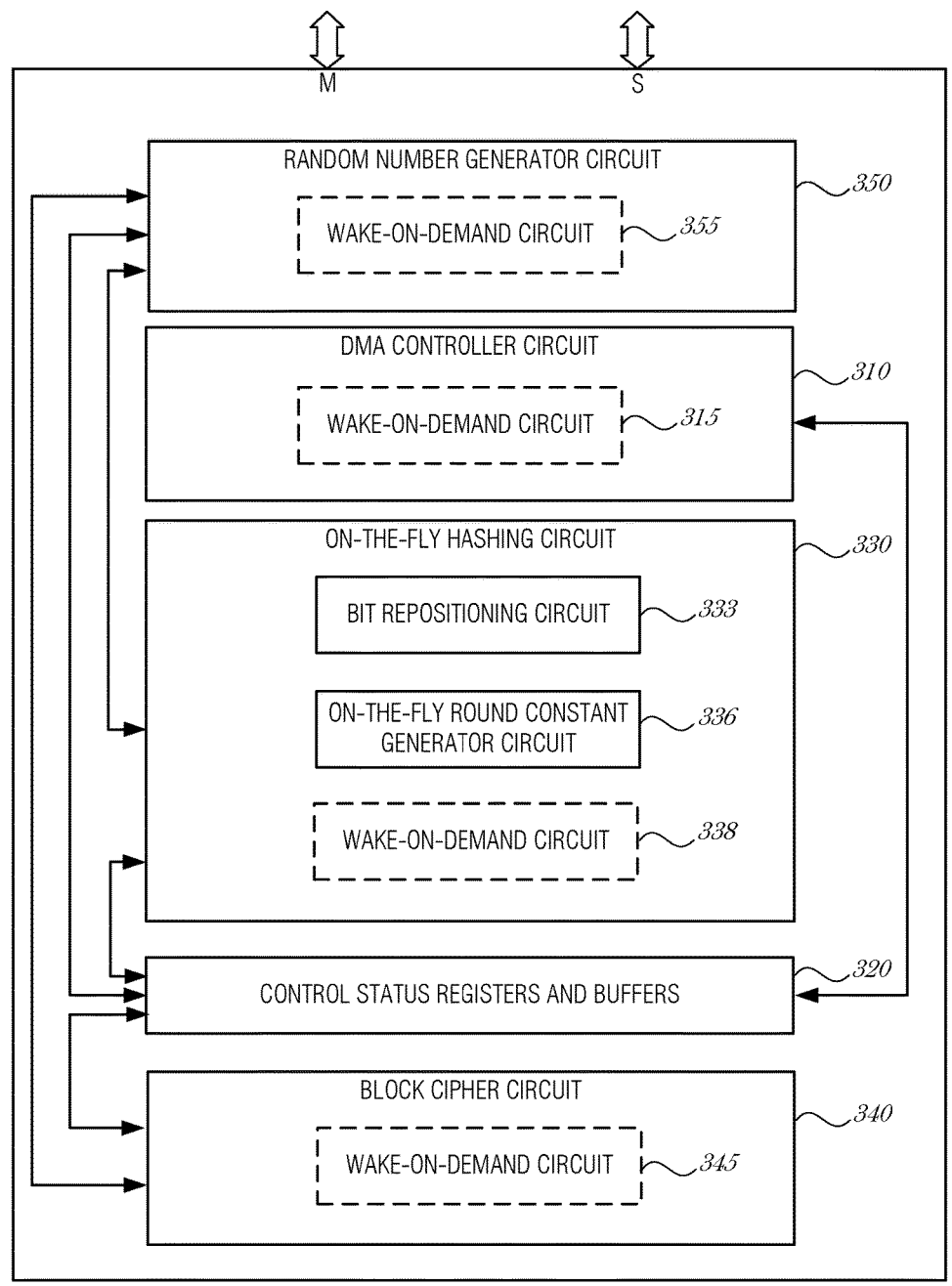
FIG. 3 is a block diagram illustrating an ULCA, according to an embodiment.

FIG. 3 is a block diagram illustrating an ULCA 300, according to an embodiment. The ULCA 300 may be an embodiment of the ULCA 200 or the ULCA 120. The ULCA 300 may include a DMA controller circuit 310, an on-the-fly hashing circuit 330, a block cipher circuit 340, and a random number generator circuit 350.

The DMA controller circuit 310 may read and write data directly to and from memory circuits over a bus. The DMA controller circuit 310 may be coupled with control status registers and buffers 320 to read and write commands, statuses, and data. The DMA controller circuit 310 may include a wake-on-demand circuit 315 to set the DMA controller circuit 310 in a low-power sleep mode upon receiving a sleep signal until receiving a wake signal, and to set the DMA controller circuit 310 in a normal operation mode upon receiving the wake signal until receiving the sleep signal.

The on-the-fly hashing circuit 330 may hash data read from a first memory circuit and perform at least one of integrity protection and firmware/software (FW/SW) verification of the data prior to writing the data to a second memory circuit. The on-the-fly hashing circuit 330 may be communicatively coupled with the control status registers and buffers 320 for both data communication and control. The on-the-fly hashing circuit 330 may be configured to perform a Keccak hash compression function. The Keccak hash compression function performed by the on-the-fly hashing circuit 330 may include a keyed hash operation.

The on-the-fly hashing circuit 330 may include a bit repositioning circuit 333 to designate an order of bits of a binary word in a register from a most significant bit (MSB) to a least significant bit (LSB) for performing computations without rotating bits in the register. The on-the-fly hashing circuit 330 may be configured to perform a Keccak hash compression function including sub-functions $\rho$ and $\pi$ using the bit repositioning circuit 333 to designate an order of bits of a binary word in a register from an MSB to an LSB instead of performing a bit rotation as in traditional implementations of the Keccak hash compression function.

The on-the-fly hashing circuit 330 may include an on-the-fly round constant generator circuit 336 to generate a round constant from a counter. The on-the-fly hashing circuit 330 may be configured to perform a Keccak hash compression function including a sub-function $\iota$ using the on-the-fly round constant generator circuit 336 to generate a round constant from a counter instead of retrieving a round constant from a storage as in traditional implementations of the Keccak hash compression function.

The on-the-fly hashing circuit 330 may include a wake-on-demand circuit 315 to set the on-the-fly hashing circuit 330 in a low-power sleep mode upon receiving a sleep signal until receiving a wake signal, and to set the on-the-fly hashing circuit 330 in a normal operation mode upon receiving the wake signal until receiving the sleep signal.

The block cipher circuit 340 may use Boolean logic to execute a block cipher encryption on the data to perform at least one of confidentiality protection and authentication of the data. The Boolean logic may perform logical operations instead of obtaining binary values from a look-up table and performing matrix multiplication while performing the block cipher encryption, as do typical block ciphers. The block cipher circuit 340 may be communicatively coupled with the control status registers and buffers 320 for both data communication and control.

The block cipher circuit 340 may include a secure PRINCE block cipher circuit. The PRINCE block cipher circuit may use a cipher block chaining message authentication code (CBC-MAC) technique to construct a message authentication code (MAC) by creating a chain of blocks where each block of the chain of blocks depends upon an encryption of the previous block in the chain of blocks. The PRINCE block cipher circuit may include a substitution-box circuit and a diffusion operation circuit that use Boolean logic to perform logical operations instead of obtaining binary values from a look-up table and performing matrix multiplication while performing the block cipher encryption, as do typical block ciphers. By using the Boolean logic instead of the look-up table and matrix multiplication, circuit area, number of gates, and latency may be improved over typical PRINCE block cipher circuits.

The block cipher circuit 340 may include a wake-on-demand circuit 345 to set the block cipher circuit 340 in a low-power sleep mode upon receiving a sleep signal until receiving a wake signal, and to set the block cipher circuit 340 in a normal operation mode upon receiving the wake signal until receiving the sleep signal.

The random number generator circuit 350 may generate a random number for use by at least one of the on-the-fly hashing circuit and the block cipher encryption circuit. The random number generator circuit 350 may generate a random number in response to a request from at least one of the on-the-fly hashing circuit and the block cipher encryption circuit, and communicate the generated random number via the control status registers and buffers 320.

The random number generator circuit 350 may include a wake-on-demand circuit 355 to set the random number generator circuit 350 in a low-power sleep mode upon receiving a sleep signal until receiving a wake signal, and to set the random number generator circuit 350 in a normal operation mode upon receiving the wake signal until receiving the sleep signal.

Figure 4:
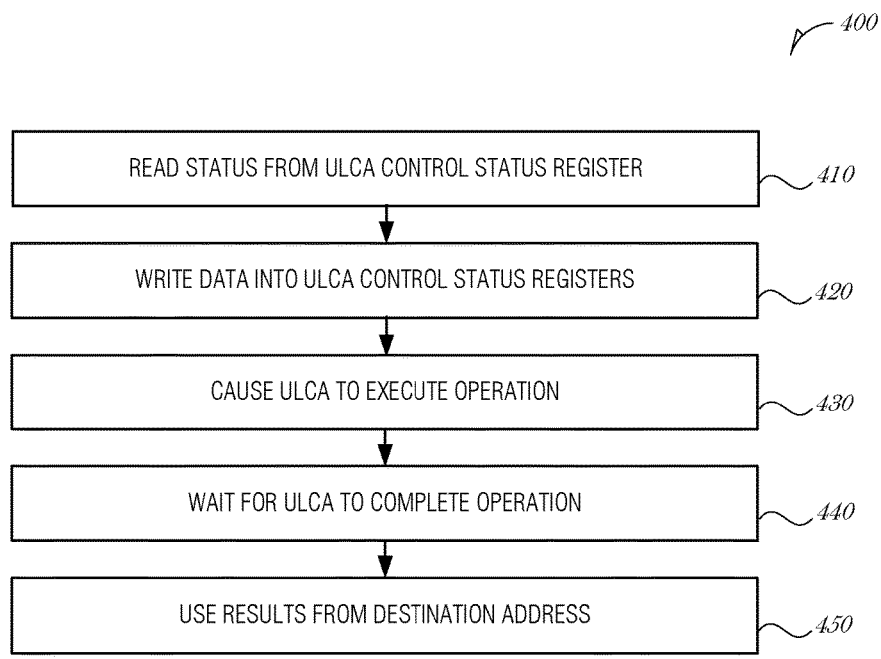
FIG. 4 is a flow diagram illustrating a method of using an ULCA by a processor, according to an embodiment.

FIG. 4 is a flow diagram illustrating a method 400 of using an ULCA by a processor, according to an embodiment. The processor may be an embodiment of the processor 110, and the ULCA may be an embodiment of the ULCA 120, 200, or 300.

In an operation 410, a status may be read from a control status register of the ULCA by a processor. In an embodiment, the status may be read over an AHB via the master port M of the processor 110 and the slave port S of the ULCA 120 as illustrated in FIG. 1. In an embodiment, the processor may wait until an idle flag of the ULCA (e.g., IDLE signal port of ULCA 200) indicates that the ULCA is not busy before reading the status, or the processor may read the status of the ULCA repeatedly until the ULCA indicates that it is not busy.

In an operation 420, the processor may write data (e.g., commands, parameters) into one or more of the control status registers of the ULCA. The control status registers may include an interrupt mask, a command, a key, an initialization vector (IV) for the block cipher circuit 250, a source address, a destination address, or other data used for performing DMA operations, hashing, encryption, or other capabilities of the ULCA. The data may be written over the AHB via the master port M of the processor 110 and the slave port S of the ULCA 120 as illustrated in FIG. 1.

In an operation 430, the processor may cause the ULCA to execute an operation, which may be according to the data written into one or more of the control status registers of the ULCA in operation 420. The operation executed by the ULCA may include a method 500 as described with reference to FIG. 5.

In an operation 440, the processor may wait for the ULCA to complete the operation caused to be executed in operation 430. While waiting, the processor may poll the ULCA for its status and/or a report on completion of its operation, or the processor may wait for an interrupt to be issued by the ULCA while the processor continues with other operations in parallel.

In an operation 450, once the processor receives a status from the ULCA indicating that the operation is complete, the ULCA is idle, or the processor receives an interrupt from the ULCA that indicates that the ULCA is done with the operation requested in operation 430, the processor may use the results of the ULCA's operation. The results of the ULCA's operation may be stored in a destination memory address specified by the processor. If the ULCA issues an interrupt to indicate that the ULCA is done with the operation requested in operation 430, for example, the ULCA's interrupt mask is set in the control status registers of the ULCA, the processor may clear the interrupt.

Figure 5:
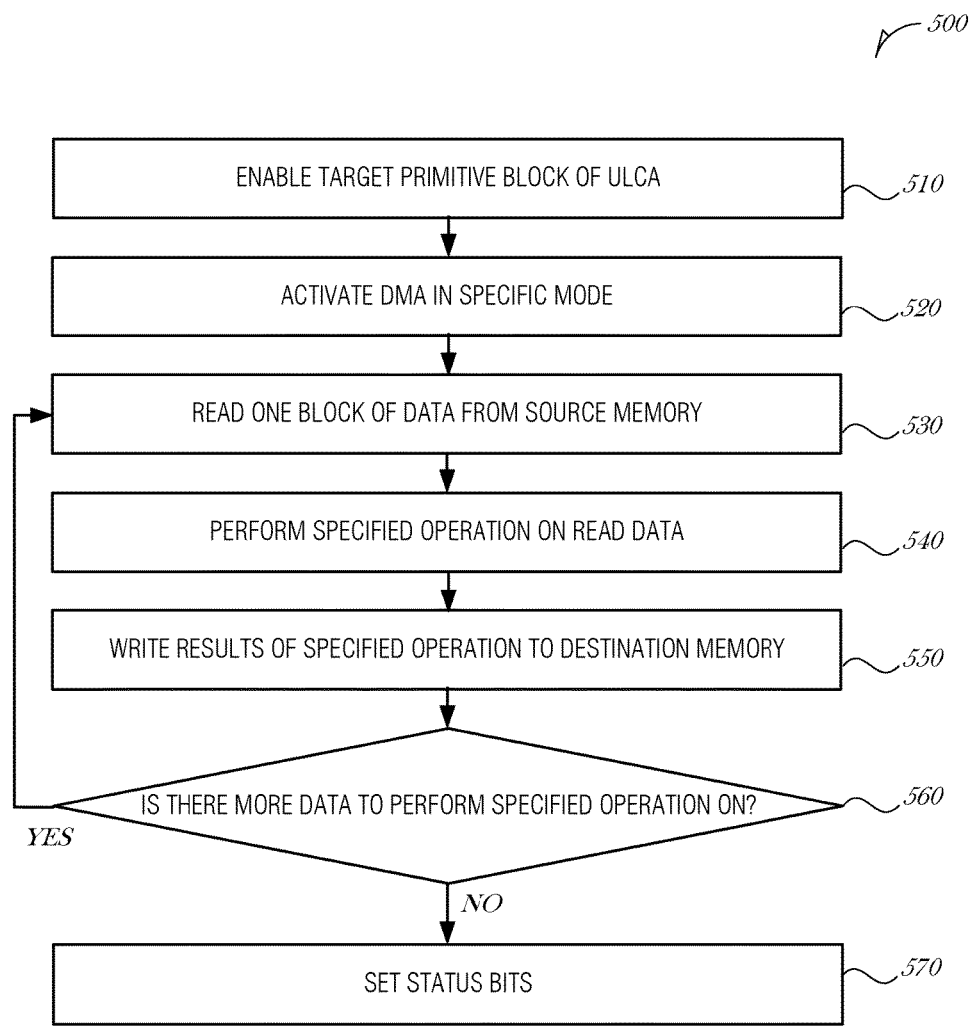
FIG. 5 is a flow diagram illustrating a method of performing cryptography by an ULCA, according to an embodiment.

FIG. 5 is a flow diagram illustrating a method 500 of performing cryptography by an ULCA, according to an embodiment. The method 500 may be performed by the ULCA upon a request to perform the method 500 received from a processor, for example, in the operation 430 discussed with reference to FIG. 4.

In an operation 510, the ULCA may enable a target primitive block of the ULCA. The primitive block may include one or more of a hashing circuit, block cipher circuit, and random number generator. In an embodiment, the enabling of the target primitive block may include an enable signal, for example, P_ENB, K_ENB, and R_ENB as illustrated in FIG. 2, to enable the block cipher circuit 250, on-the-fly hashing circuit 240, and RNG circuit 260 of the ULCA 200. In various embodiments, enabling the target primitive block may include waking on-demand one or more of a DMA controller circuit, on-the-fly hashing circuit, block cipher circuit, and random number generator circuit using a wake-on-demand circuit, to set the respective DMA controller circuit, on-the-fly hashing circuit, block cipher circuit, or random number generator circuit in a normal operation mode upon receiving the wake signal until receiving a sleep signal.

In an operation 520, the ULCA may active the DMA circuit in a specific mode according to settings in the ULCA's control status registers as set by a processor (e.g., as set in operation 420 of the method 400). In various embodiments, the DMA circuit may be enabled in a mode to read data and/or write data to system memory (e.g., SMEM 130) and/or secondary memory (e.g., secondary memory 140).

In an operation 530, the ULCA may read one block of data from the specified source memory, e.g., system memory (e.g., SMEM 130) and/or secondary memory (e.g., secondary memory 140). The data may be read into buffer memory of the ULCA.

In an operation 540, an operation specified by a processor (e.g., by the processor in operation 430 of the method 400) is performed by the ULCA on the read data. The operation specified by the processor may include a block cipher encryption or a hashing operation. The block cipher encryption or a hashing operation may also include a random number generating operation to be used by the respective block cipher encryption or hashing operation.

When performing a block cipher encryption, the ULCA may perform a secure PRINCE block cipher encryption by a block cipher encryption circuit (e.g., the block cipher 340 or the block cipher circuit 250) on the one block of data from the specified source memory. The block cipher encryption may be performed on the one block of data to perform confidentiality protection and/or authentication of the data. The PRINCE block cipher encryption may use Boolean logic to perform logical operations instead of obtaining binary values from a look-up table and performing matrix multiplication while performing the block cipher encryption, as do typical block ciphers. Following the block cipher encryption, the ULCA may construct a message authentication code (MAC) using a cipher block chaining message authentication code (CBC-MAC) technique, by creating a chain of blocks where each block of the chain of blocks depends upon an encryption of the previous block in the chain of blocks. Performing the secure PRINCE block cipher encryption may include performing an S-box operation by an S-box circuit and performing a diffusion operation by a diffusion operation circuit, using Boolean logic to perform logical operations instead of obtaining binary values from a look-up table and performing matrix multiplication while performing the block cipher encryption, as do typical block ciphers.

When performing the hashing operation, the hashing may use an on-the-fly hashing circuit of the ULCA. The hashing may be to perform at least one of integrity protection and firmware/software (FW/SW) verification of the data. The hashing may include performing a Keccak hash compression function. The Keccak hash compression function may include sub-functions ρ and π that use a bit repositioning circuit to designate an order of bits of a binary word in a register from an MSB to an LSB instead of performing a bit rotation. Performing the Keccak hash compression function may also include performing a sub-function ι using an on-the-fly round constant generator circuit to generate a round constant from a counter instead of retrieving a round constant from a storage. The Keccak hash compression function may also include a keyed hash operation.

In an operation 550, the results of the operation specified by the processor are written to the specified destination memory. The specified destination memory may include control status registers or buffers of the ULCA, which may be memory-mapped by the processor, and an external destination memory such as system memory (e.g., SMEM 130) and/or nonvolatile or flash memory (e.g., secondary memory 140).

In an operation 560, it is determined whether there is more data to perform the specified operation on by the ULCA. If there is more data to perform the specified operation on by the ULCA, the method 500 returns to the operation 530. If there is no more data to perform the specified operation on by the ULCA, the method 500 continues on to an operation 570.

In the operation 570, the ULCA sets status bits of control status registers of the ULCA. If an interrupt mask was set in the ULCA's control status registers, the ULCA may issue an interrupt to notify the processor that the ULCA has completed the specified operation. The setting of status bits may also include sleeping on-demand one or more of the DMA controller circuit, on-the-fly hashing circuit, block cipher circuit, and random number generator circuit using the wake-on-demand circuit, to set the respective DMA controller circuit, on-the-fly hashing circuit, block cipher circuit, or random number generator circuit in a low-power sleep mode upon receiving the sleep signal until receiving the wake signal. In embodiments in which the method 500 is called by the operation 440 of the method 400, after the processor is notified, the operation 440 of the method 400 may complete.

Figure 6:
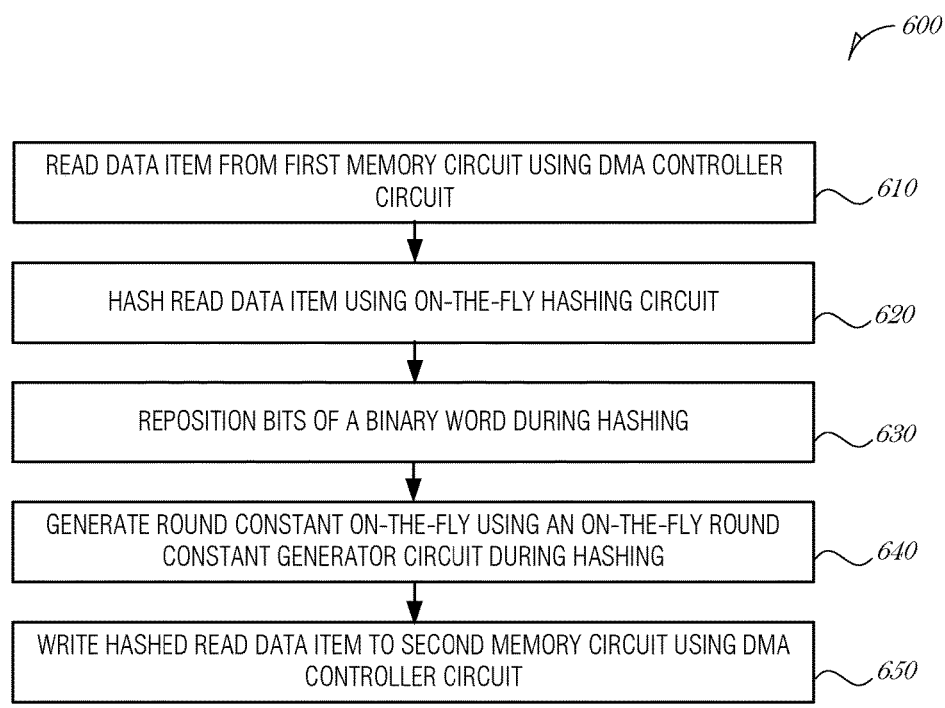
FIG. 6 is a flow diagram illustrating a method of performing hashing on-the-fly by an ULCA, according to an embodiment.

FIG. 6 is a flow diagram illustrating a method 600 of performing hashing on-the-fly by an ULCA, according to an embodiment. The method 600 may be performed by the ULCA upon a request to perform the method 600 received from a processor, for example, in the operation 430 discussed with reference to FIG. 4. The method 600 may be an embodiment of the method 500.

In an operation 610, a data item is read from a first memory circuit using a DMA controller circuit of the ULCA. The data item may include a block of data, and the first memory circuit may include a specified source memory, e.g., system memory (e.g., SMEM 130) and/or nonvolatile or flash memory (e.g., secondary memory 140). The data may be read into buffer memory of the ULCA.

In an operation 620, data read from the first memory circuit in operation 610 is hashed using an on-the-fly hashing circuit of the ULCA. The hashing may be to perform at least one of integrity protection and firmware/software (FW/SW) verification of the data. The hashing may include performing a Keccak hash compression function. The Keccak hash compression function may also include a keyed hash operation.

In an operation 630, bits of a binary word are repositioned during the hashing of the data of operation 620. The bits may be repositioned using a bit repositioning circuit by designating an order of the bits in a register from a most significant bit (MSB) to a least significant bit (LSB) for performing computations without rotating bits in the register. The Keccak hash compression function may include sub-functions ρ and π that use the bit repositioning circuit to designate an order of bits of a binary word in a register from an MSB to an LSB instead of performing a bit rotation.

In an operation 640, a round constant is generated on-the-fly using an on-the-fly round constant generator circuit during the hashing of the data of operation 620. For efficiency purposes, performing the Keccak hash compression function may also include performing a sub-function ι using the on-the-fly round constant generator circuit to generate the round constant from a counter instead of retrieving a round constant from a storage as in traditional hashing circuits.

In an operation 650, after the hashing is completed, the hashed read data item is written to a second memory circuit using the DMA controller circuit of the ULCA. The data item may include a block of data, and the second memory circuit may be a specified destination memory, e.g., system memory (e.g., SMEM 130) and/or nonvolatile or flash memory (e.g., secondary memory 140). The data may be written into buffer memory of the ULCA.

Below are example embodiments of the systems and techniques discussed above:

Example 1 is a cryptography accelerator system comprising: a direct memory access (DMA) controller circuit to read and write data directly to and from memory circuits; an on-the-fly hashing circuit to hash data read from a first memory circuit and perform at least one of integrity protection and firmware/software (FW/SW) verification of the data prior to writing the data to a second memory circuit, the on-the-fly hashing circuit including: a bit repositioning circuit to designate an order of bits of a binary word in a register from a most significant bit (MSB) to a least significant bit (LSB) for performing computations without rotating bits in the register; and an on-the-fly round constant generator circuit to generate a round constant from a counter.

In Example 2, the subject matter of Example 1 optionally includes wherein at least one of the DMA controller circuit or on-the-fly hashing circuit includes a wake-on-demand circuit to set the respective DMA controller circuit or on-the-fly hashing circuit in a low-power sleep mode upon receiving a sleep signal until receiving a wake signal, and to set the respective DMA controller or on-the-fly hashing circuit in a normal operation mode upon receiving the wake signal until receiving the sleep signal.

In Example 3, the subject matter of any one or more of Examples 1-2 optionally includes a block cipher encryption circuit to execute a block cipher encryption on the data to perform at least one of confidentiality protection and authentication of the data.

In Example 4, the subject matter of Example 3 optionally includes wherein the block cipher encryption circuit includes a wake-on-demand circuit to set the block cipher encryption circuit in a low-power sleep mode upon receiving a sleep signal until receiving a wake signal, and to set the block cipher encryption circuit in a normal operation mode upon receiving the wake signal until receiving the sleep signal.

In Example 5, the subject matter of any one or more of Examples 3-4 optionally includes wherein the block cipher encryption circuit includes a secure PRINCE block cipher circuit.

In Example 6, the subject matter of any one or more of Examples 3-5 optionally includes wherein the block cipher encryption circuit includes a secure PRINCE block cipher circuit using a cipher block chaining message authentication code (CBC-MAC) technique to construct a message authentication code (MAC) by creating a chain of blocks where each block of the chain of blocks depends upon an encryption of the previous block in the chain of blocks.

In Example 7, the subject matter of any one or more of Examples 3-6 optionally includes wherein the block cipher encryption circuit includes a secure PRINCE block cipher circuit that includes a substitution-box circuit and a diffusion operation circuit that do not use a look-up table and matrix multiplication.

In Example 8, the subject matter of any one or more of Examples 3-7 optionally includes a random number generator (RNG) circuit to generate a random number, wherein at least one of the on-the-fly hashing circuit and the block cipher encryption circuit uses the random number.

In Example 9, the subject matter of Example 8 optionally includes wherein the RNG circuit includes a wake-on-demand circuit to set the RNG circuit in a low-power sleep mode upon receiving a sleep signal until receiving a wake signal, and to set the RNG circuit in a normal operation mode upon receiving the wake signal until receiving the sleep signal.

In Example 10, the subject matter of any one or more of Examples 1-9 optionally includes wherein the on-the-fly hashing circuit is configured to perform a Keccak hash compression function.

In Example 11, the subject matter of any one or more of Examples 1-10 optionally includes wherein the on-the-fly hashing circuit is configured to perform a Keccak hash compression function including sub-functions ρ and π using the bit repositioning circuit to designate an order of bits of a binary word in a register from an MSB to an LSB instead of performing a bit rotation.

In Example 12, the subject matter of any one or more of Examples 1-11 optionally includes wherein the on-the-fly hashing circuit is configured to perform a Keccak hash compression function including a sub-function ι using the on-the-fly round constant generator circuit to generate a round constant from a counter instead of retrieving a round constant from a storage.

In Example 13, the subject matter of any one or more of Examples 1-12 optionally includes wherein the on-the-fly hashing circuit is configured to perform a Keccak hash compression function including a keyed hash operation.

Example 14 is a method of cryptography acceleration, the method comprising: reading a data item, using a direct memory access (DMA) controller circuit, from a first memory circuit; hashing the read data item, using an on-the-fly hashing circuit, to perform at least one of integrity protection and firmware/software (FW/SW) verification of the data, wherein the hashing includes: repositioning bits of a binary word, using a bit repositioning circuit, by designating an order of the bits in a register from a most significant bit (MSB) to a least significant bit (LSB) for performing computations without rotating bits in the register; and generating a round constant on-the-fly from a counter, using an on-the-fly round constant generator circuit; and writing the hashed read data item, using the DMA controller circuit, to a second memory circuit.

In Example 15, the subject matter of Example 14 optionally includes waking on-demand one or more of the DMA controller circuit and on-the-fly hashing circuit, using a wake-on-demand circuit, to set the respective DMA controller circuit or on-the-fly hashing circuit in a normal operation mode upon receiving the wake signal until receiving a sleep signal; and sleeping on-demand one or more of the DMA controller circuit and on-the-fly hashing circuit, using the wake-on-demand circuit, to set the respective DMA controller circuit or on-the-fly hashing circuit in a low-power sleep mode upon receiving the sleep signal until receiving the wake signal.

In Example 16, the subject matter of any one or more of Examples 14-15 optionally includes executing a block cipher encryption, by a block cipher encryption circuit, on the data to perform at least one of confidentiality protection and authentication of the data.

In Example 17, the subject matter of Example 16 optionally includes waking on-demand the block cipher encryption circuit, using a wake-on-demand circuit, to set the block cipher encryption circuit in a normal operation mode upon receiving a wake signal until receiving a sleep signal; and sleeping on-demand the block cipher encryption circuit, using the wake-on-demand circuit, to set the block cipher encryption circuit in a low-power sleep mode upon receiving the sleep signal until receiving the wake signal.

In Example 18, the subject matter of any one or more of Examples 16-17 optionally includes wherein executing the block cipher encryption includes performing a secure PRINCE block cipher encryption.

In Example 19, the subject matter of any one or more of Examples 16-18 optionally includes constructing a message authentication code (MAC), by a secure PRINCE block cipher circuit using a cipher block chaining message authentication code (CBC-MAC) technique, by creating a chain of blocks where each block of the chain of blocks depends upon an encryption of the previous block in the chain of blocks.

In Example 20, the subject matter of any one or more of Examples 16-19 optionally includes wherein executing the block cipher encryption includes performing a secure PRINCE block cipher encryption, including performing a substitution-box operation by a substitution-box circuit and performing a diffusion operation by a diffusion operation circuit, without using a look-up table and matrix multiplication.

In Example 21, the subject matter of any one or more of Examples 16-20 optionally includes generating a random number using a random number generator (RNG) circuit, wherein at least one of the hashing the read data item and the executing the block cipher encryption uses the random number.

In Example 22, the subject matter of Example 21 optionally includes waking on-demand the RNG circuit, using a wake-on-demand circuit, to set the RNG circuit in a normal operation mode upon receiving a wake signal until receiving a sleep signal; and sleeping on-demand the RNG circuit, using the wake-on-demand circuit, to set the RNG circuit in a low-power sleep mode upon receiving the sleep signal until receiving the wake signal.

In Example 23, the subject matter of any one or more of Examples 14-22 optionally includes wherein hashing the read data item includes performing a Keccak hash compression function.

In Example 24, the subject matter of any one or more of Examples 14-23 optionally includes wherein hashing the read data item includes performing a Keccak hash compression function including sub-functions $\rho$ and $\pi$ using the bit repositioning circuit to designate an order of bits of a binary word in a register from an MSB to an LSB instead of performing a bit rotation.

In Example 25, the subject matter of any one or more of Examples 14-24 optionally includes wherein hashing the read data item includes performing a Keccak hash compression function including a sub-function $\iota$ using the on-the-fly round constant generator circuit to generate a round constant from a counter instead of retrieving a round constant from a storage.

In Example 26, the subject matter of any one or more of Examples 14-25 optionally includes wherein hashing the read data item includes performing a Keccak hash compression function including a keyed hash operation.

Example 27 is at least one machine-readable medium including instructions, which when executed by a machine, cause the machine to perform operations of any of the methods of Examples 14-26.

Example 28 is an apparatus comprising means for performing any of the methods of Examples 14-26.

Example 29 is a system for cryptography acceleration, the system comprising: means for reading a data item, using means for direct memory access (DMA), from a first memory circuit; means for hashing the read data item on-the-fly, to perform at least one of integrity protection and firmware/software (FW/SW) verification of the data, wherein the means for hashing includes: means for repositioning bits of a binary word by designating an order of the bits in a register from a most significant bit (MSB) to a least significant bit (LSB) for performing computations without rotating bits in the register; and means for generating a round constant on-the-fly from a counter; and means for writing the hashed read data item, using the means for DMA, to a second memory circuit.

In Example 30, the subject matter of Example 29 optionally includes means for waking on-demand one or more of the means for DMA and the means for hashing, using means for wake-on-demand, to set the respective means for DMA or means for hashing in a normal operation mode upon receiving the wake signal until receiving a sleep signal; means for sleeping on-demand one or more of the means for DMA and means for hashing, using the means for wake-on-demand, to set the respective means for DMA or means for hashing in a low-power sleep mode upon receiving the sleep signal until receiving the wake signal.

In Example 31, the subject matter of any one or more of Examples 29-30 optionally includes means for block cipher encryption on the data to perform at least one of confidentiality protection and authentication of the data.

In Example 32, the subject matter of Example 31 optionally includes means for waking on-demand the means for block cipher encryption, to set the means for block cipher encryption in a normal operation mode upon receiving a wake signal until receiving a sleep signal; and means for sleeping on-demand the means for block cipher encryption, to set the means for block cipher encryption in a low-power sleep mode upon receiving the sleep signal until receiving the wake signal.

In Example 33, the subject matter of any one or more of Examples 31-32 optionally includes wherein the means for block cipher encryption includes means for secure PRINCE block cipher encryption.

In Example 34, the subject matter of any one or more of Examples 31-33 optionally includes means for constructing a message authentication code (MAC), by means for performing a secure PRINCE block cipher encryption using means for cipher block chaining message authentication code (CBC-MAC), by means for creating a chain of blocks where each block of the chain of blocks depends upon an encryption of the previous block in the chain of blocks.

In Example 35, the subject matter of any one or more of Examples 31-34 optionally includes wherein the means for block cipher encryption includes means for performing a secure PRINCE block cipher encryption, including means for performing a substitution-box operation and means for performing a diffusion operation, without using a look-up table and matrix multiplication.

In Example 36, the subject matter of any one or more of Examples 31-35 optionally includes means for generating a random number, wherein at least one of the means for hashing and the means for block cipher encryption uses the random number.

In Example 37, the subject matter of Example 36 optionally includes means for waking on-demand the means for generating a random number, to set the means for generating a random number in a normal operation mode upon receiving a wake signal until receiving a sleep signal; and means for sleeping on-demand the means for generating a random number, to set the means for generating a random number in a low-power sleep mode upon receiving the sleep signal until receiving the wake signal.

In Example 38, the subject matter of any one or more of Examples 29-37 optionally includes wherein the means for hashing includes means for performing a Keccak hash compression function.

In Example 39, the subject matter of any one or more of Examples 29-38 optionally includes wherein the means for hashing includes means for performing a Keccak hash compression function including sub-functions $\rho$ and $\pi$ using the means for bit repositioning to designate an order of bits of a binary word in a register from an MSB to an LSB instead of performing a bit rotation.

In Example 40, the subject matter of any one or more of Examples 29-39 optionally includes wherein the means for hashing includes means for performing a Keccak hash compression function including a sub-function $\iota$ using the means for generating an on-the-fly round constant from a counter instead of retrieving a round constant from a storage.

In Example 41, the subject matter of any one or more of Examples 29-40 optionally includes wherein the means for hashing includes means for performing a Keccak hash compression function including a keyed hash operation.

Example 42 is a system configured to perform operations of any one or more of Examples 1-41.

Example 43 is a method for performing operations of any one or more of Examples 1-41.

Example 44 is a machine readable medium including instructions that, when executed by a machine cause the machine to perform the operations of any one or more of Examples 1-41.

Example 45 is a system comprising means for performing the operations of any one or more of Examples 1-41.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instructions on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term "hardware module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hard-wired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computer, laptop computer, tablet computer, server, smart phone, etc.

Figure 7:
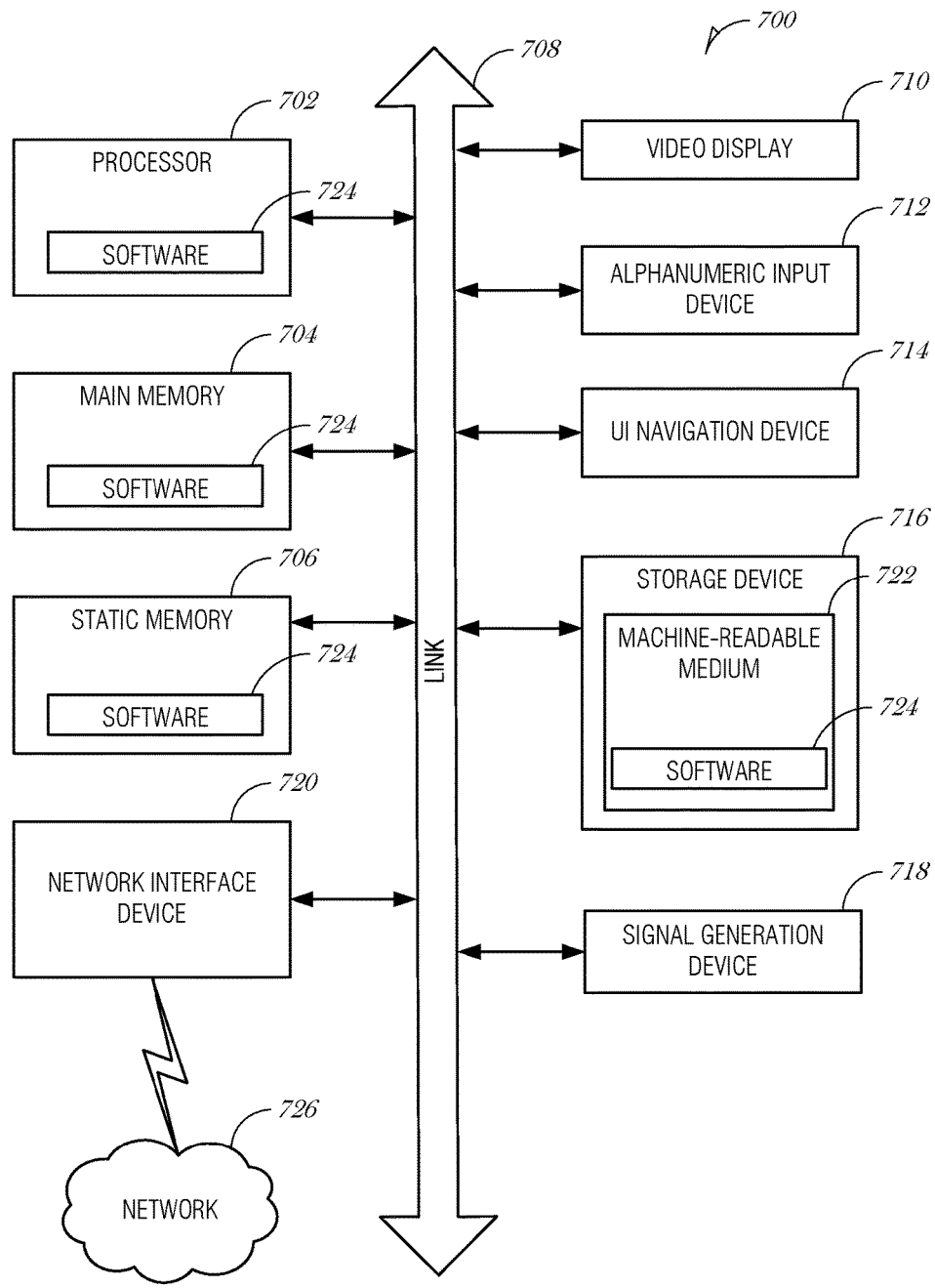
FIG. 7 is an example machine upon which any of the techniques (e.g., methodologies) discussed herein may perform, according to an example embodiment.

FIG. 7 is a block diagram illustrating a machine in the example form of a computer system 700, within which a set or sequence of instructions may be executed to cause the machine to perform any one or more of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a wearable device, a personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

The computer system 700 includes at least one processor 702 (e.g., a central processing unit (CPU), a GPU, or both, processor cores, compute nodes, etc.), a main memory 704, and a static memory 706, which communicate with each other via a link 708 (e.g., bus). The computer system 700 may further include a video display unit 710, an alphanumeric input device 712 (e.g., a keyboard), and a user interface (UI) navigation device 714 (e.g., a mouse). In one embodiment, the video display unit 710, input device 712, and UI navigation device 714 are incorporated into a touch screen display. The computer system 700 may additionally include a storage device 716 (e.g., a drive unit), a signal generation device 718 (e.g., a speaker), a network interface device 720, and one or more sensors (not shown), such as a GPS sensor, compass, accelerometer, gyrometer, magnetometer, or other sensor.

The storage device 716 includes a machine-readable medium 722 on which is stored one or more sets of data structures and software 724 (e.g., instructions) embodying or utilized by any one or more of the methodologies or functions described herein. The instructions 724 may also reside, completely or at least partially, within the main memory 704, within the static memory 706, and/or within the processor 702 during execution thereof by the computer system 700, with the main memory 704, the static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communication network 726 using a transmission medium via the network interface device 720 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible media to facilitate communication of such software.

The above Detailed Description includes references to the accompanying drawings, which form a part of the Detailed Description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In addition "a set of" includes one or more elements. In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

What is claimed is:

1. A cryptography accelerator system comprising:
    a direct memory access (DMA) controller circuit to read and write data directly to and from memory circuits; and
    an on-the-fly hashing circuit to hash data read from a first memory circuit and perform at least one of integrity protection and firmware/software (FW/SW) verification of the data prior to writing the data to a second memory circuit, the on-the-fly hashing circuit including:
        a bit repositioning circuit to designate an order of bits of a binary word in a register from a most significant bit (MSB) to a least significant bit (LSB) for performing computations without rotating bits in the register; and
        an on-the-fly round constant generator circuit to generate a round constant from a counter,
    wherein at least one of the DMA controller circuit or on-the-fly hashing circuit includes a wake-on-demand circuit to set the respective DMA controller circuit or on-the-fly hashing circuit in a low-power sleep mode upon receiving a sleep signal until receiving a wake signal, and to set the respective DMA controller or on-the-fly hashing circuit in a normal operation mode upon receiving the wake signal until receiving the sleep signal.

2. The system of claim 1, further comprising a block cipher encryption circuit to execute a block cipher encryption on the data to perform at least one of confidentiality protection and authentication of the data.

3. The system of claim 2, wherein the block cipher encryption circuit includes a wake-on-demand circuit to set the block cipher encryption circuit in a low-power sleep mode upon receiving a sleep signal until receiving a wake signal, and to set the block cipher encryption circuit in a normal operation mode upon receiving the wake signal until receiving the sleep signal.

4. The system of claim 2, wherein the block cipher encryption circuit includes a secure PRINCE block cipher circuit.

5. The system of claim 2, wherein the block cipher encryption circuit includes a secure PRINCE block cipher circuit using a cipher block chaining message authentication code (CBC-MAC) technique to construct a message authentication code (MAC) by creating a chain of blocks where each block of the chain of blocks depends upon an encryption of the previous block in the chain of blocks.

6. The system of claim 2, wherein the block cipher encryption circuit includes a secure PRINCE block cipher circuit that includes a substitution-box circuit and a diffusion operation circuit that do not use a look-up table and matrix multiplication.

7. The system of claim 2, further comprising a random number generator (RNG) circuit to generate a random number, wherein at least one of the on-the-fly hashing circuit and the block cipher encryption circuit uses the random number.

8. The system of claim 7, wherein the RNG circuit includes a wake-on-demand circuit to set the RNG circuit in a low-power sleep mode upon receiving a sleep signal until receiving a wake signal, and to set the RNG circuit in a normal operation mode upon receiving the wake signal until receiving the sleep signal.

9. The system of claim 1, wherein the on-the-fly hashing circuit is configured to perform a Keccak hash compression function including sub-functions ρ and π using the bit repositioning circuit to designate an order of bits of a binary word in a register from an MSB to an LSB instead of performing a bit rotation.

10. The system of claim 1, wherein the on-the-fly hashing circuit is configured to perform a Keccak hash compression function including a sub-function t using the on-the-fly round constant generator circuit to generate a round constant from a counter instead of retrieving a round constant from a storage.

11. The system of claim 1, wherein the on-the-fly hashing circuit is configured to perform a Keccak hash compression function including a keyed hash operation.

12. A method of cryptography acceleration, the method comprising:
reading a data item, using a direct memory access (DMA) controller circuit, from a first memory circuit; and
hashing the read data item, using an on-the-fly hashing circuit, to perform at least one of integrity protection and firmware/software (FW/SW) verification of the data, wherein the hashing includes:
repositioning bits of a binary word, using a bit repositioning circuit, by designating an order of the bits in a register from a most significant bit (MSB) to a least significant bit (LSB) for performing computations without rotating bits in the register; and
generating a round constant on-the-fly from a counter, using an on-the-fly round constant generator circuit; and
writing the hashed read data item, using the DMA controller circuit, to a second memory circuit;
waking on-demand one or more of the DMA controller circuit and on-the-fly hashing circuit, using a wake-on-demand circuit, to set the respective DMA controller circuit or on-the-fly hashing circuit in a normal operation mode upon receiving the wake signal until receiving a sleep signal; and
sleeping on-demand one or more of the DMA controller circuit and on-the-fly hashing circuit, using the wake-on-demand circuit, to set the respective DMA controller circuit or on-the-fly hashing circuit in a low-power sleep mode upon receiving the sleep signal until receiving the wake signal.

13. The method of claim 12, further comprising executing a block cipher encryption, by a block cipher encryption circuit, on the data to perform at least one of confidentiality protection and authentication of the data.

14. The method of claim 13, further comprising:
waking on-demand the block cipher encryption circuit, using a wake-on-demand circuit, to set the block cipher encryption circuit in a normal operation mode upon receiving a wake signal until receiving a sleep signal; and
sleeping on-demand the block cipher encryption circuit, using the wake-on-demand circuit, to set the block cipher encryption circuit in a low-power sleep mode upon receiving the sleep signal until receiving the wake signal.

15. The method of claim 13, wherein executing the block cipher encryption includes performing a secure PRINCE block cipher encryption.

16. The method of claim 13, further comprising constructing a message authentication code (MAC), by a secure PRINCE block cipher circuit using a cipher block chaining message authentication code (CBC-MAC) technique, by creating a chain of blocks where each block of the chain of blocks depends upon an encryption of the previous block in the chain of blocks.

17. The method of claim 13, wherein executing the block cipher encryption includes performing a secure PRINCE block cipher encryption, including performing a substitution-box operation by a substitution-box circuit and performing a diffusion operation by a diffusion operation circuit, without using a look-up table and matrix multiplication.

18. The method of claim 13, further comprising generating a random number using a random number generator (RNG) circuit, wherein at least one of the hashing the read data item and the executing the block cipher encryption uses the random number.

19. The method of claim 18, further comprising:
waking on-demand the RNG circuit, using a wake-on-demand circuit, to set the RNG circuit in a normal operation mode upon receiving a wake signal until receiving a sleep signal; and
sleeping on-demand the RNG circuit, using the wake-on-demand circuit, to set the RNG circuit in a low-power sleep mode upon receiving the sleep signal until receiving the wake signal.

20. The method of claim 12, wherein hashing the read data item includes performing a Keccak hash compression function including sub-functions ρ and π using the bit repositioning circuit to designate an order of bits of a binary word in a register from an MSB to an LSB instead of performing a bit rotation.

21. The method of claim 12, wherein hashing the read data item includes performing a Keccak hash compression function including a sub-function t using the on-the-fly round constant generator circuit to generate a round constant from a counter instead of retrieving a round constant from a storage.

22. At least one non-transitory machine-readable medium including instructions, which when executed by a machine, cause the machine to perform the following operations:
reading a data item, using a direct memory access (DMA) controller circuit, from a first memory circuit;

hashing the read data item, using an on-the-fly hashing circuit, to perform at least one of integrity protection and firmware/software (FW/SW) verification of the data, wherein the hashing includes:
  repositioning bits of a binary word, using a bit repositioning circuit, by designating an order of the bits in a register from a most significant bit (MSB) to a least significant bit (LSB) for performing computations without rotating bits in the register, and
  generating a round constant on-the-fly from a counter, using an on-the-fly round constant generator circuit; and
  writing the hashed read data item, using the DMA controller circuit, to a second memory circuit;
waking on-demand one or more of the DMA controller circuit and on-the-fly hashing circuit, using a wake-on-demand circuit, to set the respective DMA controller circuit or on-the-fly hashing circuit in a normal operation mode upon receiving the wake signal until receiving a sleep signal; and
sleeping on-demand one or more of the DMA controller circuit and on-the-fly hashing circuit, using the wake-on-demand circuit, to set the respective DMA controller circuit or on-the-fly hashing circuit in a low-power sleep mode upon receiving the sleep signal until receiving the wake signal.

23. The at least one machine-readable medium of claim 22, further including instructions, which when executed by a machine, cause the machine to execute a block cipher encryption on the data to perform at least one of confidentiality protection and authentication of the data.

* * * * *